(12) United States Patent
Shin et al.

(10) Patent No.: US 10,206,233 B2
(45) Date of Patent: Feb. 12, 2019

(54) METHOD AND APPARATUS FOR AUTOMATIC SWITCHING BETWEEN DEVICES

(71) Applicant: Samsung Electronics Co., Ltd., Gyeonggi-do (KR)

(72) Inventors: In-Young Shin, Seoul (KR); Mayuresh Madhukar Patil, Bangalore (IN); Aram Cho, Gyeonggi-do (KR); Kiran Bharadwaj Vedula, Bangalore (IN); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 15/123,907

(22) PCT Filed: Mar. 4, 2015

(86) PCT No.: PCT/KR2015/002092
§ 371 (c)(1),
(2) Date: Sep. 6, 2016

(87) PCT Pub. No.: WO2015/133819
PCT Pub. Date: Sep. 11, 2015

(65) Prior Publication Data
US 2017/0019939 A1   Jan. 19, 2017

Related U.S. Application Data

(60) Provisional application No. 61/947,728, filed on Mar. 4, 2014.

(30) Foreign Application Priority Data

Mar. 5, 2014   (IN) .............................. 268/KOL/2014

(51) Int. Cl.
*H04J 1/16* (2006.01)
*H04W 76/14* (2018.01)
(Continued)

(52) U.S. Cl.
CPC ........... *H04W 76/14* (2018.02); *H04L 67/104* (2013.01); *H04L 67/148* (2013.01); *H04W 4/80* (2018.02);
(Continued)

(58) Field of Classification Search
CPC ..... H04W 76/023; H04W 8/00; H04W 8/005; H04W 48/18; H04W 76/021
See application file for complete search history.

(56) References Cited

U.S. PATENT DOCUMENTS 7,827,495 B2   11/2010   Bells et al.
9,485,719 B2 *  11/2016   Song ..................... H04W 8/005
(Continued)

FOREIGN PATENT DOCUMENTS

CA   2 867 783   10/2013
CN   1697412   11/2005
(Continued)

OTHER PUBLICATIONS

PCT/ISA/210 Search Report issued on PCT/KR2015/002092 (pp. 3).
(Continued)

*Primary Examiner* — Maharishi V Khirodhar
(74) *Attorney, Agent, or Firm* — The Farrell Law Firm, P.C.

(57) ABSTRACT

The present invention relates to an automatic switching method. A device according to an embodiment of the present invention is an automatic switching device in a second device, which comprises a controller for enabling the second device, together with a first device, to perform a terminal discovery and a service discovery, transmit a connection request message including a continuous connection field and an automatic connection mode from the second device, and receive a particular service from the first device on the basis
(Continued)

of the information included in the connection request message, wherein the continuous connection field includes a service identifier.

12 Claims, 13 Drawing Sheets

(51) Int. Cl.
    *H04W 8/00*     (2009.01)
    *H04W 48/18*     (2009.01)
    *H04L 29/08*     (2006.01)
    *H04W 4/80*     (2018.01)
    *H04W 76/11*     (2018.01)

(52) U.S. Cl.
    CPC ............. *H04W 8/00* (2013.01); *H04W 8/005* (2013.01); *H04W 48/18* (2013.01); *H04L 67/141* (2013.01); *H04W 76/11* (2018.02)

(56) References Cited

U.S. PATENT DOCUMENTS

| | | | |
|---|---|---|---|
| 9,876,862 B1* | 1/2018 | Lambert | H04L 67/16 |
| 2005/0254524 A1 | 11/2005 | An | |
| 2011/0047214 A1 | 2/2011 | Lee et al. | |
| 2011/0149806 A1* | 6/2011 | Verma | H04L 12/2809 |
| | | | 370/255 |
| 2011/0175722 A1* | 7/2011 | Jensen | G08B 13/14 |
| | | | 340/539.1 |
| 2011/0281557 A1* | 11/2011 | Choi | H04L 63/0853 |
| | | | 455/411 |
| 2013/0034023 A1 | 2/2013 | Jung | |
| 2013/0045678 A1 | 2/2013 | Lee | |
| 2013/0170482 A1 | 7/2013 | Jung | |
| 2013/0234913 A1 | 9/2013 | Thangadorai et al. | |
| 2013/0281067 A1 | 10/2013 | Takizawa et al. | |
| 2014/0055276 A1* | 2/2014 | Logan | H04Q 9/00 |
| | | | 340/686.6 |
| 2014/0059263 A1 | 2/2014 | Rosenberg et al. | |
| 2014/0337544 A1* | 11/2014 | Huang | G06F 13/385 |
| | | | 710/63 |
| 2015/0085847 A1 | 3/2015 | Yamaura | |

FOREIGN PATENT DOCUMENTS

| | | |
|---|---|---|
| CN | 102484779 | 5/2012 |
| CN | 103150132 | 6/2013 |
| CN | 103210632 | 7/2013 |
| CN | 103368935 | 10/2013 |
| EP | 2 555 490 | 2/2013 |
| EP | 2 634 999 | 9/2013 |
| KR | 1020100004340 | 1/2010 |
| KR | 1020130015135 | 2/2013 |
| KR | 1020130019848 | 2/2013 |
| KR | 1020130113160 | 10/2013 |
| KR | 1020140005613 | 1/2014 |

OTHER PUBLICATIONS

PCT/ISA/237 Written Opinion issued on PCT/KR2015/002092 (pp. 7).
Wi-Fi Alliance, "Wi-Fi Peer-to-Peer (P2P) Technical Specification V1.1", XP-009163866, Internet Citation, Jan. 1, 2010, 159 pages.
Wi-Fi Alliance, "Wi-Fi Alliance Technical Committee, Wi-Fi Display Technical Task Group, Wi-Fi Display Technical Specification V1.0.0", XP-055320680, Jan. 1, 2012, 149 pages.
European Search Report dated Oct. 17, 2017 issued in counterpart application No. 15758833.6-1853, 14 pages.
Chinese Office Action dated Jul. 5, 2017 issued in counterpart application No. 201580011993.5, 19 pages.
Wi-Fi Alliance, "Wi-Fi Certified Miracast TM: Extending the Wi-Fi Experience to Seamless Video Display", XP-002700078, Internet Citation, Sep. 19, 2012, 18 pages.
Chinese Office Action dated Sep. 30, 2018 issued in counterpart application No. 201580011897.0, 10 pages.

* cited by examiner

METHOD AND APPARATUS FOR AUTOMATIC SWITCHING BETWEEN DEVICES

PRIORITY

This application is a National Phase Entry of PCT International Application No. PCT/KR2015/002092, which was filed on Mar. 4, 2015, and claims priority to U.S. Provisional Application No. 61/947,728, which was filed on Mar. 3, 2014, and Indian Patent Application No. 268/KOL/2014, which was filed on Mar. 5, 2014, the contents of each of which are incorporated herein by reference.

TECHNICAL FIELD

The present invention relates to an automatic switching method and device.

BACKGROUND ART

Along with the development of vehicles, not only mechanical devices which used to be the core elements that make up a vehicle, such as an engine, a shaft, and a wheel, but also in-vehicle electronic devices that fine-control the mechanical devices, using an IT technology have been increasingly important. In addition, the number and the complexity of electrical and electronic equipment applied to a vehicle are also increasing.

In the automotive field, a head unit, particularly, has been recognized as one of the most important devices. A head unit is usually located in the middle of the front seat of a vehicle. A head unit is a synthesis control device in which a temperature control device such as an in-vehicle air conditioner and a heater, an entertainment system, a rear-view camera display, a GPS system, etc., are integrated.

There is a case where a button capable of controlling the head unit is attached to a user steering wheel for a safety reason, and such a button may also be included in the category of the head unit in a broader sense. A user controls various in-vehicle devices through a head unit before starting driving, during the driving, and at the time of finishing driving.

DETAILED DESCRIPTION OF THE INVENTION

Technical Problem

The present invention provides a method and device for seamlessly switching between a cellular phone in a house and a head unit in a vehicle through a Wi-Fi connection mode without an operation by a user.

The present invention provides a method and device for efficiently performing a discovery process by preconfiguring service information.

Technical Solution

An automatic switching method in a first device according to an embodiment of the present invention includes the steps of: performing, by the first device together with a second device, a terminal discovery process and a service discovery operation; receiving a connection request message including a persistent connection field and an automatic connection mode from the second device; and providing a particular service to the second device based on information included in the connection request message, wherein the persistent connection field includes a service identifier.

An automatic switching device in a first device according to an embodiment of the present invention includes a control unit that enables the first device to perform, together with a second device, a terminal discovery process and a service discovery operation, receive a connection request message including a persistent connection field and an automatic connection mode from the second device, and provide a particular service to the second device based on information included in the connection request message, wherein the persistent connection field includes a service identifier.

An automatic switching method in a second device according to an embodiment of the present invention includes the steps of performing, by the second device together with a first device, a terminal discovery process and a service discovery operation; transmitting a connection request message including a persistent connection field and an automatic connection mode from the second device; and receiving a particular service from the first device based on information included in the connection request message, wherein the persistent connection field includes a service identifier.

An automatic switching device in a second device according to an embodiment of the present invention includes a control unit that enables the second device to perform, together with a first device, a terminal discovery process and a service discovery operation, transmit a connection request message including a persistent connection field and an automatic connection mode, and receive a particular service from the first device based on information included in the connection request message, wherein the persistent connection field includes a service identifier.

MODE FOR CARRYING OUT THE INVENTION

Figure 1:
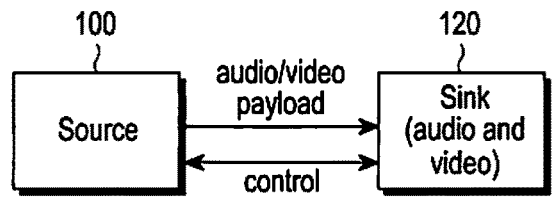
FIG. 1 is a structural diagram of a Wi-Fi display (WFD) system.

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Further, terms or words used in the description and claims below should not be interpreted as only general or dictionary meanings, but interpreted as meanings and concepts satisfying the technical spirit of the present invention based on a principle in that the inventor can appropriately define his/her invention with a concept of the terms in order to describe the invention in the best method.

A phone, a cellular phone, a mobile phone, and a smart phone, which will be described hereinafter are portable phones, are connectable through Wi-Fi, 3G, LTE, etc., and signify phones in which an application may be installed, but are not limited thereto. Hereinafter, a phone, a cellular phone, a mobile phone, and a smart phone will be used and described together.

In order to safely operate a mobile phone while driving, operating a cellular phone through a head unit including a specialized UI for safety while driving may be a method that enables a continuous use of a smart phone and the safety of a driver at the same time. To this end, according to the present invention, a network connection (e.g., wired and wireless connections, etc.) is provided between a head unit of a vehicle and a cellular phone, a function of a cellular phone is controlled through a head unit, and a mirroring operation for transmitting a UI of a cellular phone to a head unit is applied.

FIG. 1 is a structural diagram of a Wi-Fi display (WFD) system.

A WFD system includes a WFD source 100 (described as a phone hereinafter) and a WFD sink device 120 (described as IVI hereinafter), and is a technology to transmit, to the WFD sink device 120, a screen viewed on a display of the WFD source device 100 and a reproduced audio content in real time. For example, when the WFD source device 100 is assumed to be a cellular phone and the WFD sink device 120 is assumed to be a TV, a UI or a movie viewed through the cellular phone can be viewed through a large screen such as TV. Here, a user can control a UI through the WFD source device 100 or the WFD sink device 120, and a user input is transmitted from the WFD sink device 120 to the WFD source device 100 when the user intends to control a device through the WFD sink device 120.

Figure 2:
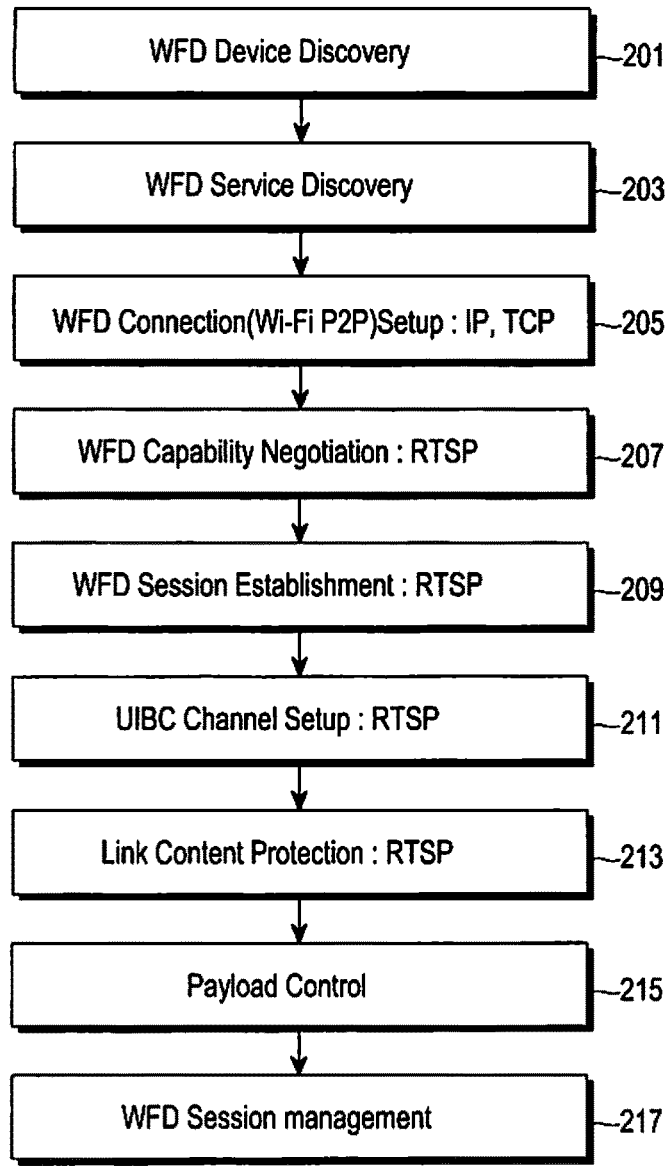
FIG. 2 is a flow diagram illustrating a WFD configuration process.

FIG. 2 is a flow diagram illustrating a WFD configuration process.

First, the WFD source device discovers a device supporting WFD (e.g., a WFD sink device) through a WFD device discovery process 201, and identifies additional information through a WFD service discovery process 203. Then, the WFD source device configures Internet protocol (IP) and transmission control protocol (TCP) channels through a WFD connection setup process 205, and performs a WFD capability negotiation process 207 through a real time streaming protocol (RTSP) protocol. Then, the WFD source device establishes 211 a user input back channel (UIBC) through the RTSP protocol such that the WFD sink device 120 may control the WFD source device 100 after establishing 209 a WFD session through the RTSP protocol. Then, the WFD source device transmits 215, 217 content of the WFD source device 100 to the WFD sink device 120 after going through a link content protection process 213 through the RTSP protocol for channel protection at the time of data transmission.

In recent years, a user desires to connect to and communicate with a head unit in a vehicle from the user's house. Here, the user desires to seamlessly switch between a cellular phone in a house and a head unit in a vehicle. Here, the user desires to switch between the cellular phone in the house and the head unit in the vehicle through a Wi-Fi connection mode without an operation by the user.

The present invention provides a method and device for seamlessly switching between a cellular phone in a house and a head unit in a vehicle through a Wi-Fi connection mode without an operation by a user.

Figure 7:
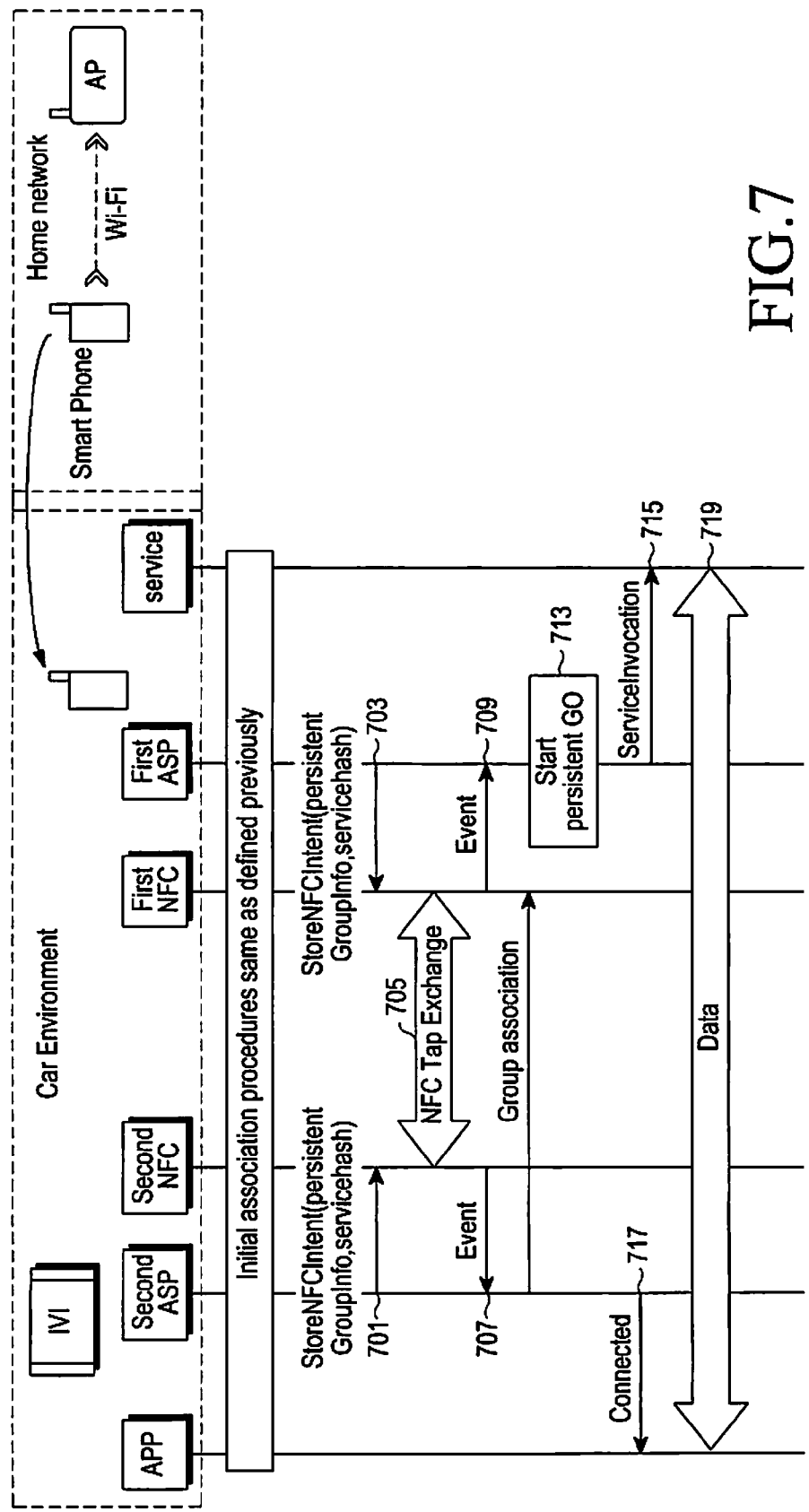
FIG. 7 is a flow diagram illustrating an automatic switching method according to a third embodiment of the present invention.
Figure 8:
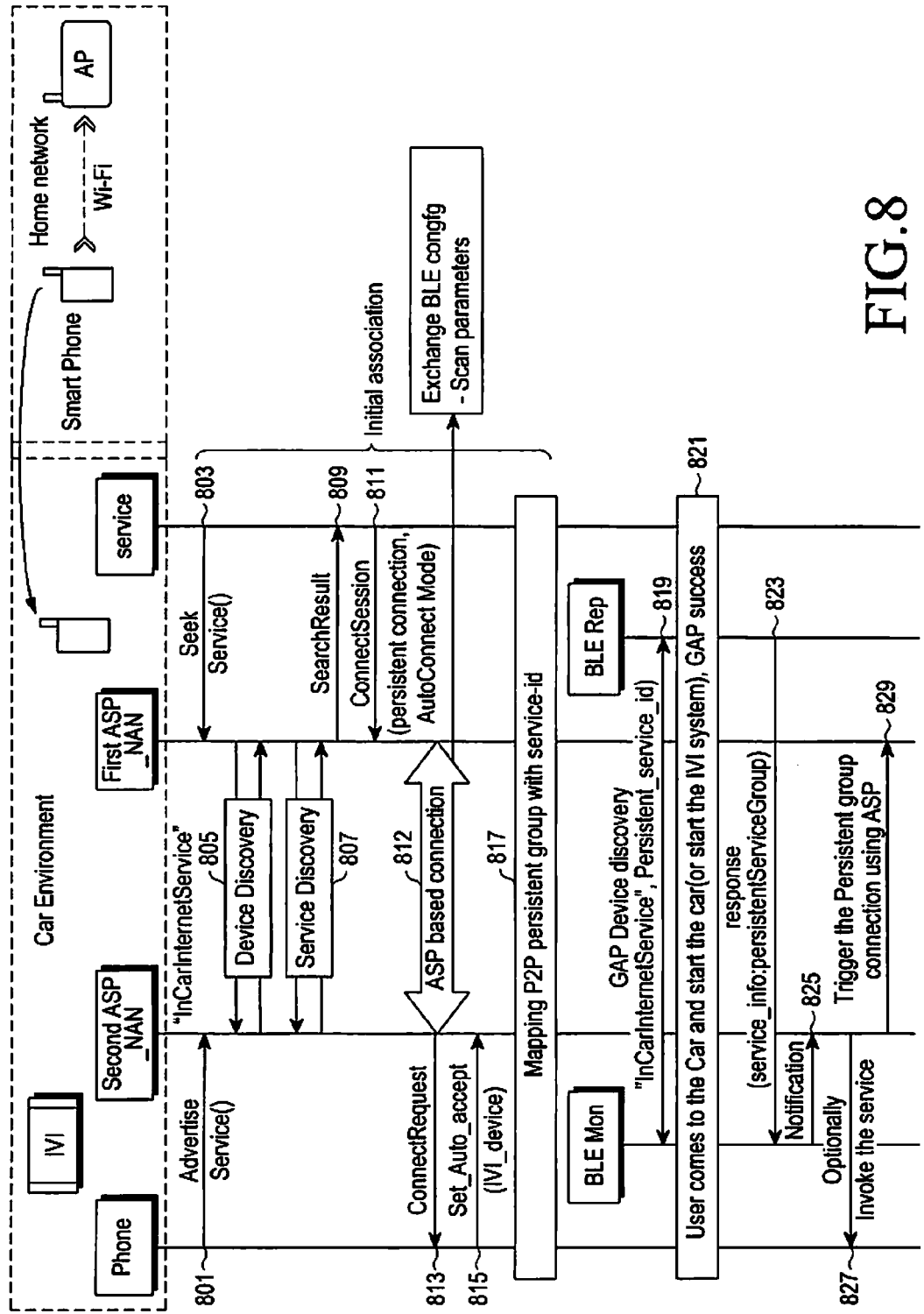
FIG. 8 is a flow diagram illustrating an automatic switching method according to a fourth embodiment of the present invention.

A first embodiment of the present invention indicates a switching method in a case of a WFDS (FIG. 3 to FIG. 5), a second embodiment of the present invention indicates a switching method in a case of a connection to an NAN network (FIG. 6), a third embodiment of the present invention indicates a switching method through NFC (FIG. 7), and a fourth embodiment of the present invention indicates a switching method through Bluetooth (FIG. 8). The present invention can be applied to all communication schemes using short range communication.

Figure 3:
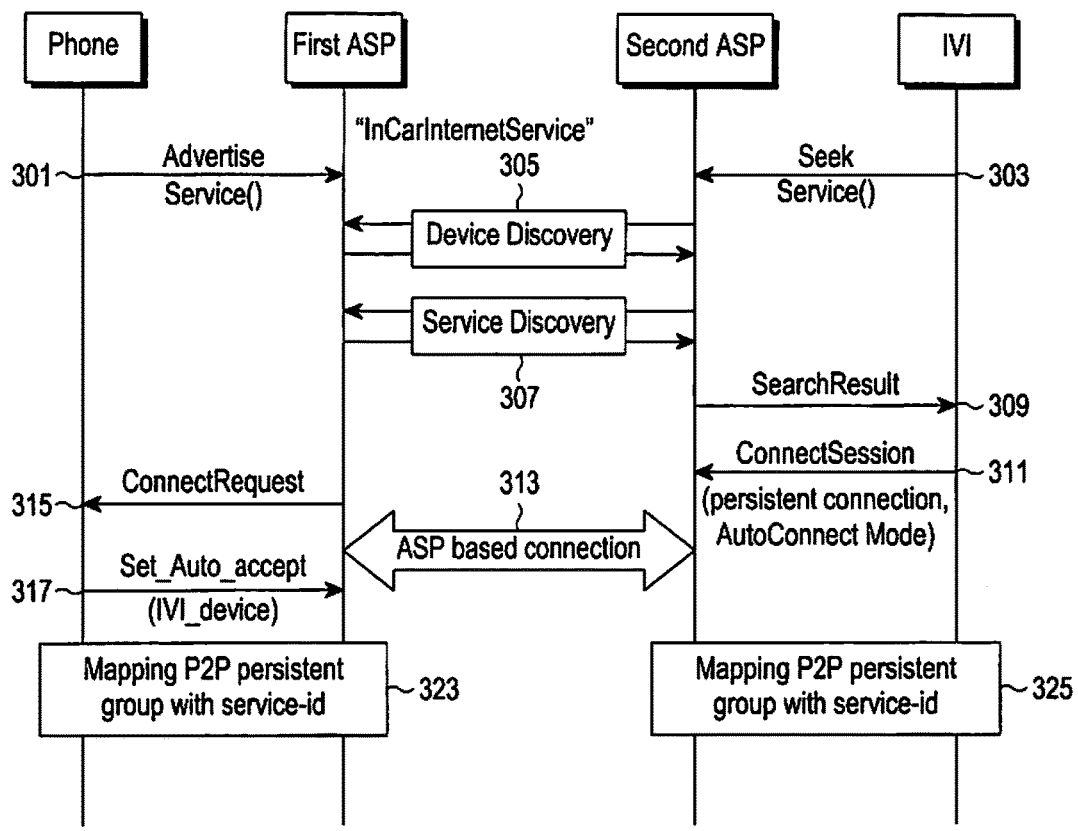
FIG. 3 is a flow diagram illustrating an automatic switching method according to a first embodiment of the present invention.

FIG. 3 is a flow diagram illustrating an automatic switching method according to a first embodiment of the present invention.

An overall operation of FIG. 3 is referred to as an association operation.

A smart phone area, as indicated in FIG. 3, includes a phone (here, a phone means a cellular phone, a mobile phone, a smart phone, and so on) and a first application service platform (ASP), and a vehicle environment includes a second ASP and in-vehicle infotainment (IVI). The phone means a WFD source device and IVI means a WFD sink device. The first ASP means an ASP layer within the phone, and the second ASP means an ASP layer within the IVI.

First, the phone transmits a service or an advertisement message including a particular service name to the first ASP, in step 301. The advertisement message may further include a message identifier, contact information, a terminal identifier, and so on.

At the same time, the IVI transmits a service or a seek message including a service name to the second ASP, in step 303.

The first ASP discovers a device supporting WFD (e.g., a WFD sink device) through a device discovery process in step 305, and discovers a service supporting WFD through a WFD service discovery process in step 307.

The second ASP transmits a result (i.e., a retrieved result) retrieved in step 309 to the IVI. And then, the IVI transmits a connection session message including a persistent connection (persistent connection) and an automatic connection mode to the second ASP, in step 311. Here, the persistent connection is used to initialize a P2P persistent connection, maintain a service context for a particular service connection, and perform mapping of a persistent P2P group and the service context. The persistent connection includes a service identifier. The automatic connection mode is used for automatically connecting to the phone when a particular service is requested, that is, for requesting to enable an automatic connection state mode.

Then, the first ASP and the second ASP are connected, in step 313. Then, the first ASP transmits a connection request message to the phone, in step 315. Then, the phone transmits, to the first ASP, a set auto accept message that configures an automatic acceptance mode for the particular service only for the IVI, not for other devices, in step 317. Then, the phone and the IVI perform mapping of the P2P persistent group with a service ID, like in steps 319 and 321.

Figure 4:
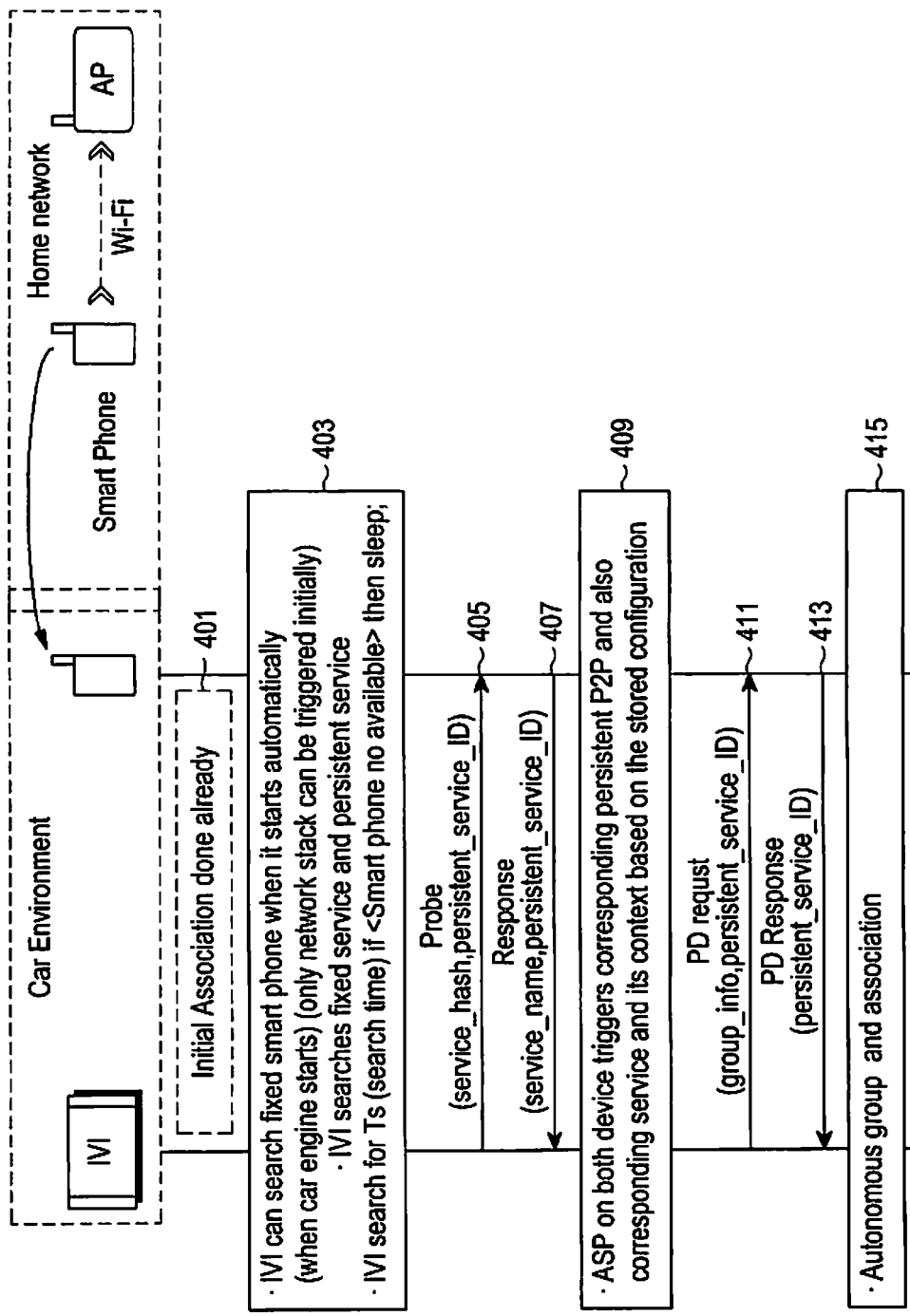
FIG. 4 is a flow diagram illustrating continuous operations of FIG. 3 according to the first embodiment of the present invention.

FIG. 4 is a flow diagram illustrating continuous operations of FIG. 3 according to the first embodiment of the present invention.

FIG. 4 indicates a WFD configuration process when a phone in a home network has moved within a vehicle environment.

As indicated in reference numeral 401, an initial association is assumed to have already been made.

The IVI, when a vehicle starts or a network stack is initially triggered in step 403, may perform a search for a fixed smart phone and perform a search for a fixed service and a persistent service. If the phone is not available, the IVI performs a search during a Ts (search time), and then performs a switch to a sleep mode. The phone may maintain reception strength (e.g., RSSI) based on a switching mode or a rule for triggering handover, while the IVI uses another method for the same.

After step 403, the IVI transmits a probe request message including service hash and persistent_service_ID to the phone in the vehicle, in step 405. The service_hash uses a hash value of service ID identification information or a hash index for a fast search for a service. The persistent_service_ID indicates an ID of a particular service (e.g., an Internet service). Then, the phone transmits, to the IVI, a probe response message including the name (service_name) and persistent_service_ID of the particular service, in step 407. Then, like in step 409, ASPs of all devices trigger a corresponding persistent P2P, a corresponding service, and a service context, based on stored configuration information. Then, the IVI transmits, to the phone, a PD request message including group information and the persistent_service_ID, in step 411.

In order to respond thereto, the phone transmits, to the IVI, a PD response message including the persistent_service_ID, in step 413. Then, the IVI and the phone automatically form an association with a group, in step 415. At the time of formation, the association may be formed according to a network state, device capability, and a service state.

Figure 5:
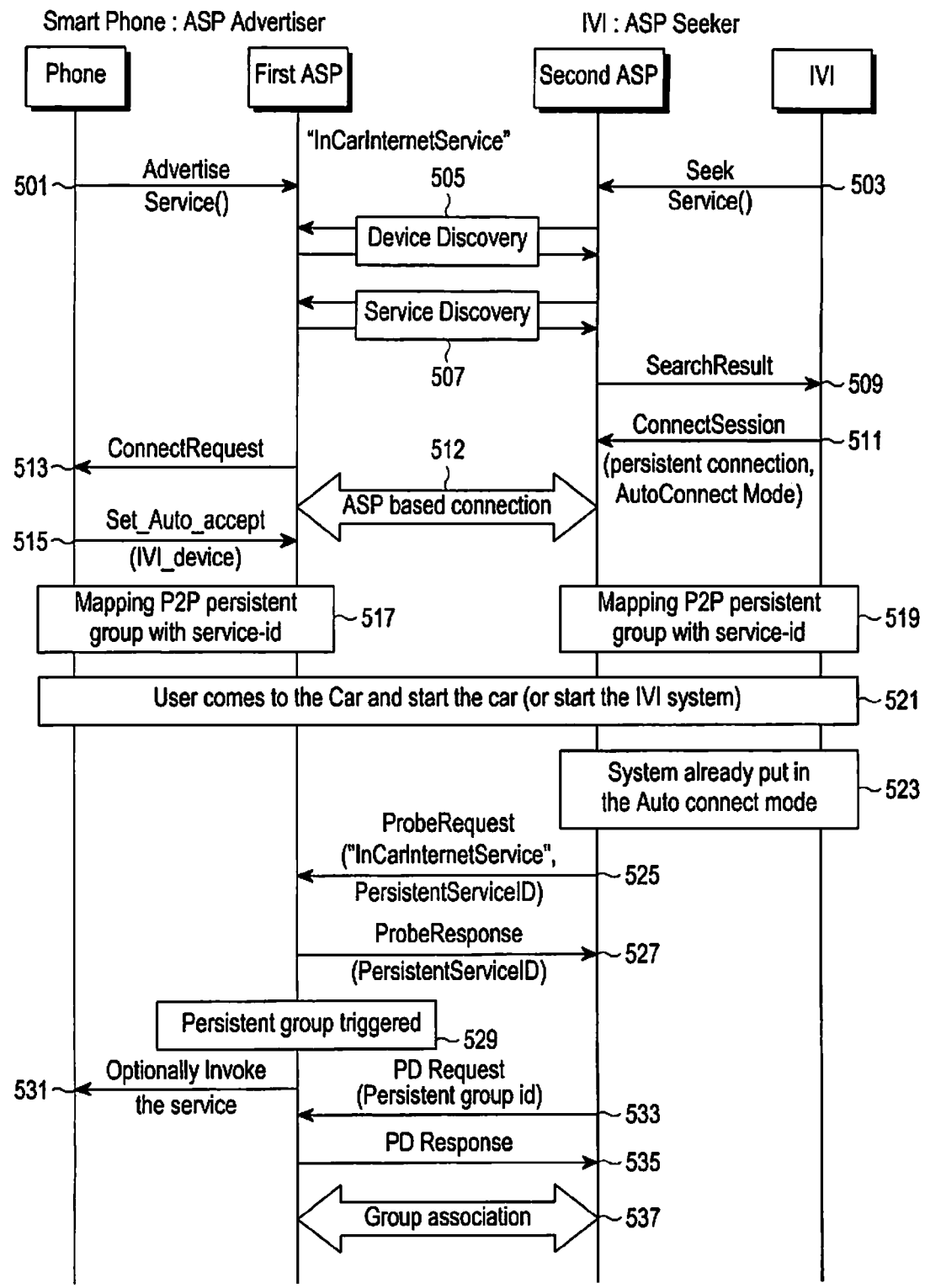
FIG. 5 is a flow diagram illustrating a combination of FIG. 3 and FIG. 4 according to the first embodiment of the present invention.

FIG. 5 is a flow diagram illustrating a combination of FIG. 3 and FIG. 4 according to the first embodiment of the present invention.

FIG. 5 is similar to FIG. 3 and FIG. 4. Steps 501 to 519 of FIG. 5 are the same as steps 301 to 321 of FIG. 3.

In step 521, a user of the phone gets in the vehicle, and starts the vehicle or operates an IVI system. Then, the IVI and the second ASP are in an automatic connection mode state, in step 523.

Then, the second ASP transmits, to the first ASP, a probe request message including "InCarInternetService" and PersistentServiceID, in step 525. The first ASP transmits a probe response message including PersistentServiceID, in step 527.

The first ASP invokes a particular service using the phone in step 531 when triggered by a persistent group in step 529. Step 531 may be selectively performed.

Meanwhile, the second ASP transmits, to the first ASP, a provision discovery (PD) request message including PersistentGroupID in step 533, and the first ASP transmits, to the second ASP, a PD response message in step 535. A group association is performed between the first ASP and the second ASP, in step 537.

Figure 6:
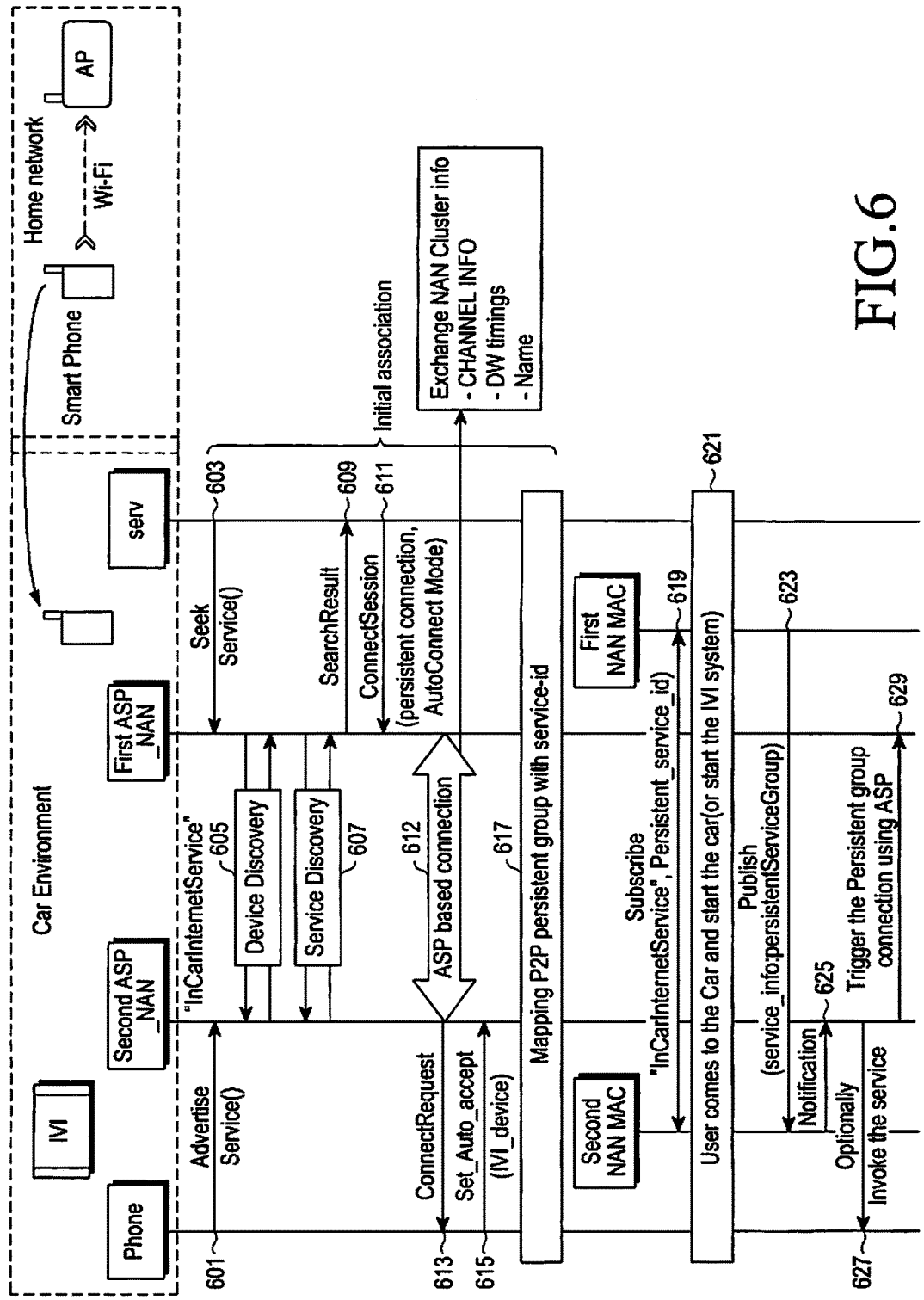
FIG. 6 is a flow diagram illustrating an automatic switching method according to a second embodiment of the present invention.

FIG. 6 is a flow diagram illustrating an automatic switching method according to a second embodiment of the present invention. That is, FIG. 6 is a flow diagram illustrating an automatic switching method, by an IVI and a phone in a vehicle, using a network (e.g., neighbor aware network: NAN) based on a lower power discovery protocol.

The IVI includes an application layer and a first ASP based on a NAN. The phone includes a second ASP based on an NAN and a service layer.

Steps 601 to 617 of FIG. 6 and steps 301 to 321 of FIG. 3 have the same operations but have different subjects of the operations. However, the first ASP and the second ASP exchange NAN cluster information, in step 612. The NAN cluster information includes channel information, DW timing, a name, and so on.

Then, the second ASP transmits, to the first ASP, a subscription message including "InCarInternetService" and Persistent_Service_ID, in step 619. The phone, using another method, may maintain reception strength (e.g., RSSI) based on a rule for triggering an NAN message (or handover).

In step 621, a user of the phone gets in the vehicle, and starts the vehicle or operates an IVI system.

When an NAN MAC layer of the phone transmits, to an NAN MAC layer of the IVI, a publish message including service information and PersistentGroupID, in step 623, the NAN MAC layer of the IVI transmits a notification message to the second ASP based on a NAN within the IVI, in step 625. Service information, for example, is In-use, No-use, and so on. That is, a type of a service provided by a device, i.e., service information may be acquired through a service discovery process.

Selectively (like in step 627), the second ASP based on an NAN requests to invoke a service from the application layer of the IVI.

In step 629, the second ASP based on an NAN triggers a persistent group connection, using the first ASP based on an NAN of the phone as an ASP. Then, a group association is performed in the first ASP based on an NAN and the second ASP based on an NAN.

FIG. 7 is a flow diagram illustrating an automatic switching method according to a third embodiment of the present invention. That is, FIG. 7 is a flow diagram illustrating an automatic switching method when a phone in a vehicle connects to an IVI through NFC.

When a user gets in the vehicle in order to connect to a car Internet service, the user uses NFC.

An initial association operation is assumed to have already been made.

In comparison with FIG. 5, it is clear that an NFC layer in a vehicle environment and an NFC layer within the phone are added in order to provide a car Internet service using NFC.

In step 701, NFCintent information (e.g., PersistentGroupInfo, servicehash information, and so on) is stored in a second NFC and a second ASP in the vehicle environment. In addition, in step 703, NFCintent information (e.g., PersistentGroupinfo, servicehash information, and so on) is also stored in a first NFC and a first ASP within the phone. NFCintent information includes information on a type of PersistentGroup to be generated. NFCintent information further includes service_intent. The service_intent means a six-octet service hash value corresponding to the car Internet service provided by the phone. PersistentGroupInfo includes P2P group information and includes an identifier.

Then, an NFC tap is exchanged between the first NFC and the second NFC, in step 705. Then, in the second NFC, an event message is transmitted to the second ASP, in step 707. Along with this, later in the first NFC, an event message is transmitted to the first ASP, in step 709. Then, a group association is performed in the second ASP through the first NFC. When the group association is performed, the first ASP starts persistent group owner (GO), in step 713. Further, in step 717, the second ASP of the IVI connects to the application layer of the IVI, and the first ASP within the phone transmits a ServiceInvocation message to the service layer of the phone. Accordingly, the IVI and the phone may transmit or receive data, in step 719.

FIG. 8 is a flow diagram illustrating an automatic switching method according to a fourth embodiment of the present invention. That is, FIG. 8 is a flow diagram illustrating an automatic switching method when a phone in a vehicle connects to an IVI through Bluetooth (or wireless LAN).

Steps 801 to 817 of FIG. 8 and steps 301 to 321 of FIG. 3 have the same operations. Meanwhile, a first ASP and a second ASP exchange Bluetooth information including a scan parameter, in step 812.

A Bluetooth layer of the phone performs an inter-Bluetooth layer GAP device discovery process of the IVI. Here, a GAP device discovery message includes "InCarInternetService" and PersistentServiceID.

In step 821, a user of the phone gets in the vehicle, and starts the vehicle, operates an IVI system, or successfully performs GAP.

Then, the Bluetooth layer of the phone transmits a response message to the Bluetooth layer of the IVI, in step 823. Here, the response message includes service information and PersistentServiceGroup.

The Bluetooth layer of the IVI transmits a notification message to the second ASP based on Bluetooth within the IVI, in step 825. Selectively (like in step 827), the second ASP based on Bluetooth requests to invoke a service from the application layer of the IVI.

In step 829, the second ASP based on Bluetooth triggers a persistent group connection, using the first ASP based on Bluetooth of the phone as an ASP. Then, a group association is performed in the first ASP based on Bluetooth and the second ASP based on Bluetooth.

Figure 9A:
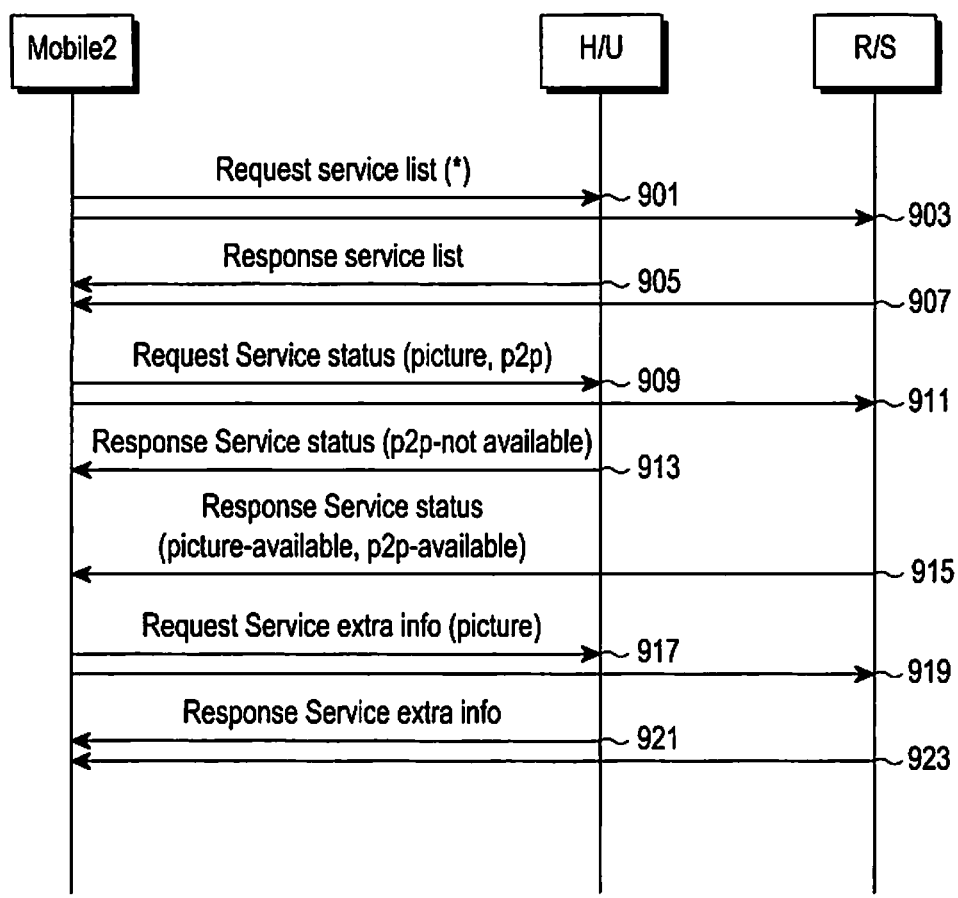
FIG. 9a and FIG. 9b are flow diagrams illustrating a discovery method according to another embodiment of the present invention.
Figure 9B:
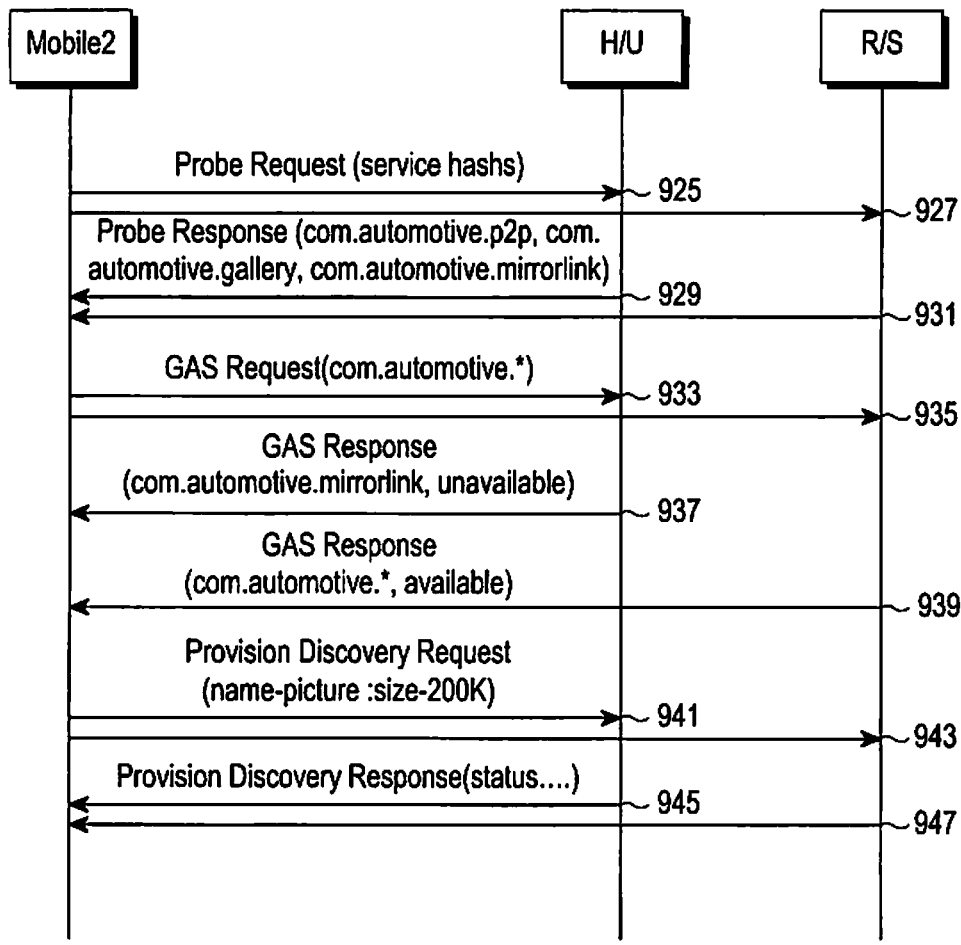

FIG. 9a and FIG. 9b are flow diagrams illustrating a discovery method according to another embodiment of the present invention.

Steps 901 to 923 indicate a case of using Wi-Fi, and steps 925 to 947 indicate a case of using a WFDS.

In FIG. 9, mobile 2 indicates a phone, H/U indicates a head unit, and R/S indicates a proximate device that exists near the head unit in a vehicle and is capable of display. Hereinafter, the R/S is referred to as a proximate device.

When using a WFDS, the phone transmits a probe request message including a service hash to a head unit, in step 925, and transmits a probe request message including a service hash to a proximate device, in step 927. Then, the head unit and the proximate device transmit a probe response message to the phone (step 929, step 931). Here, the probe response message includes com.automotive.p2p, com.automotive.gallery, com.automotive.mirrorlink, and so on. Here, a new service name may be defined in a P2P service discovery (SD), and a service here may be provided based on an application, a Wi-Fi mode, or the like.

The phone transmits a generic advertisement service (GAS) request message including com.automotive.* to the head unit, in step 933, and transmits a GAS request message including com.automotive.* to the proximate device, in step 935.

The GAS request message may be transmitted in a GAS action frame form. The GAS action frame includes an access network query protocol (ANQP) field.

The GAS action frame includes an access network type (e.g., private network, free public network, for-paid public network, and so on), a roaming consortium, venue information, and so on.

Then, the head unit and the proximate device transmit a probe response message to the phone (step 937, step 939). Here, the probe response message includes com.automotive.mirrorlink, unavailable, and so on. Accordingly, service availability in the vehicle may be managed.

Then, the phone transmits, to the head unit, a provision discovery request including name-picture:size-200K, in step 943, and transmits, to the proximate device, a provision discovery request including name-picture:size-200K, in step 945.

Then, the head unit and the proximate device transmit a provision discovery response including state information to the phone (step 945, step 947).

Figure 10:
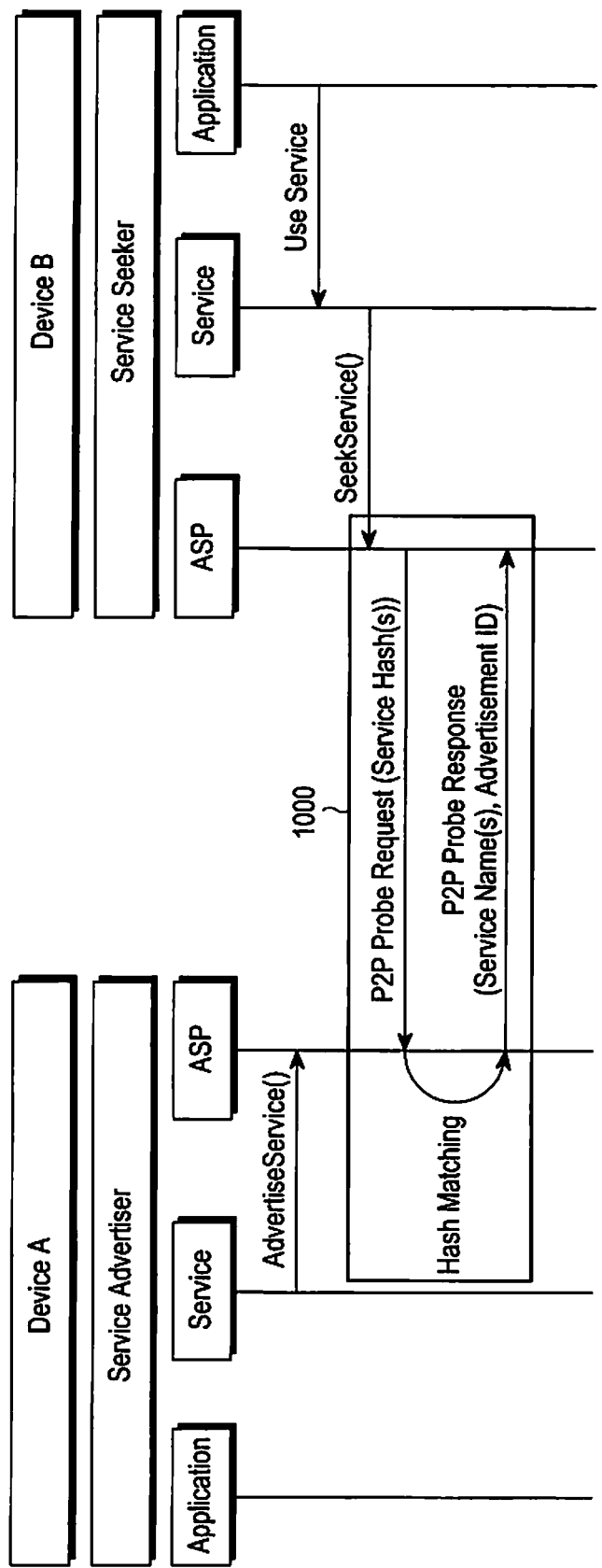
FIG. 10 is a flow diagram illustrating a discovery method according to still another embodiment of the present invention.

FIG. 10 is a flow diagram illustrating a discovery method according to still another embodiment of the present invention.

In step 1000 of FIG. 10, when an ASP of an IVI transmits a P2P probe request message including a service hash to an ASP of a phone, the ASP of the phone transmits a P2P probe response message including a service name(s) and advertisementID.

Before an association operation, the phone recognizes a service provided through a particular device (e.g., an IVI device, a proximate device, and so on). To this end, a new service name is defined, and whether a service is a single service or a multi-service is indicated.

In a P2P discovery, a service may be a service for one application, and may be a general service used by a number of applications. A service name may be a unique name. A new service and services in a Wi-Fi mode may be predefined. For example, the service may be defined as [TABLE 1] below.

TABLE 1

| Value | Meaning |
| --- | --- |
| 0 | All service protocol types |
| 1 | Bonjour |
| 2 | UPnP |
| 3 | WS-Discovery |
| 4 | Wi-Fi Display |
| 5-254 | reserved |
| 255 | vendor specific |

In a case of Bonjour in [TABLE 1] above, the service may be indicated as [TABLE 2] below.

TABLE 2

| afpovertcp._tcp.local_ipp._tcp.local |
| --- |

In a case of UPnP in [TABLE 1] above, the service may be indicated as [TABLE 3] below.

TABLE 3

0x10 urn:schemas-upnp-org:device:InternetGatewayDevice:10x10
upnp:rootdevice

In the P2P SD, if multi-service hash values are included in the probe request frame (or message) in a P2P IE, the receiver (terminal) may transmit a probe response message to listed information.

Figure 11:
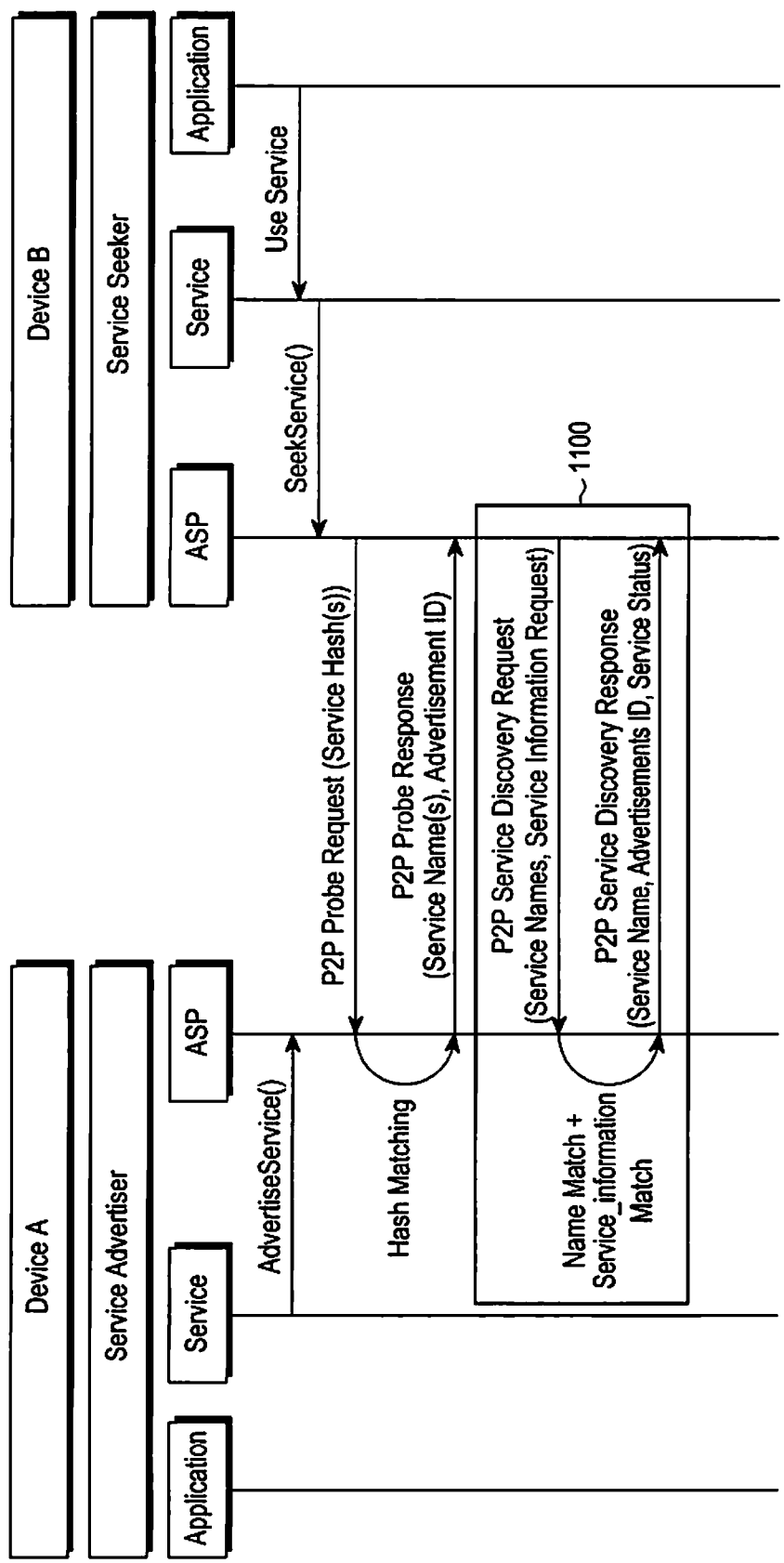
FIG. 11 is a flow diagram illustrating a discovery method according to still another embodiment of the present invention.

FIG. 11 is a flow diagram illustrating a discovery method according to still another embodiment of the present invention.

The phone recognizes an operating application process and content for a particular device (e.g., an IVI device, a proximate device, and so on).

FIG. 11 and step 1000 of FIG. 10 are the same. In step 1100, a P2P service discovery process is performed between an ASP of the phone and an ASP of the IVI. Here, a P2P service discovery request message includes a service name and a service information request, and a P2P service discovery response message includes a service name, advertisementID, and a service state.

Figure 12:
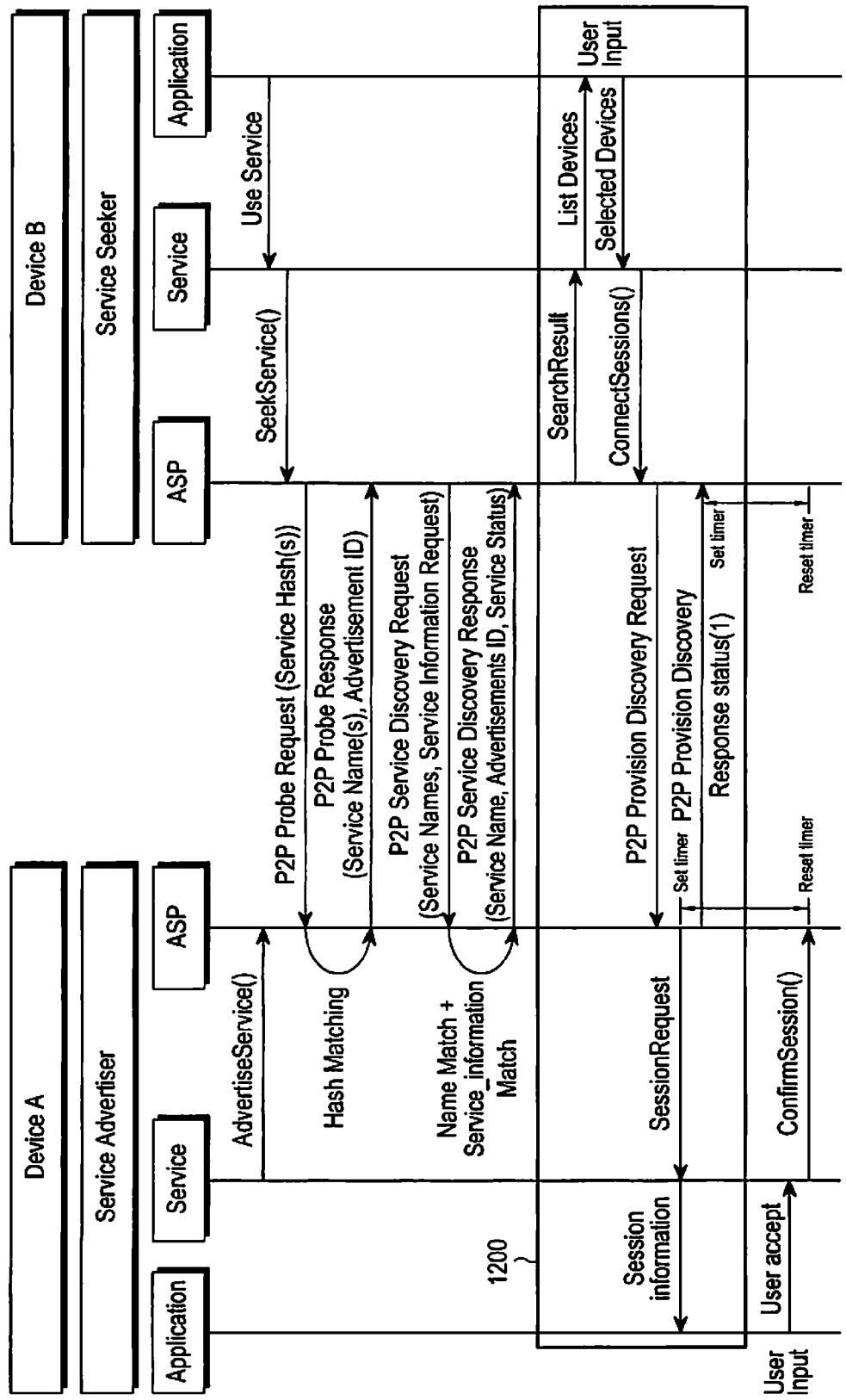
FIG. 12 is a flow diagram illustrating a discovery method according to still another embodiment of the present invention.

FIG. 12 is a flow diagram illustrating a discovery method according to still another embodiment of the present invention.

In comparison with FIG. 11, step 1200 is further added in FIG. 12. In step 1200, a P2P provision discovery process is performed between an ASP of the phone and an ASP of the IVI. In step 1200, a timer is driven and a P2P provision discovery response message includes state information. A P2P provision discovery request message having an attribute value of information on session information data may be indicated in a P2P IE. Here, the session information data is a string that explains a content to be reproduced to a user at a remote distance. Play service—session_information format, for example, may be indicated as [TABLE 4] below.

TABLE 4 name-<value>:duration-<value>:size-<value>:numberOfItems-<value>,
ex.   name-superman returns:duration-9240

Figure 13:
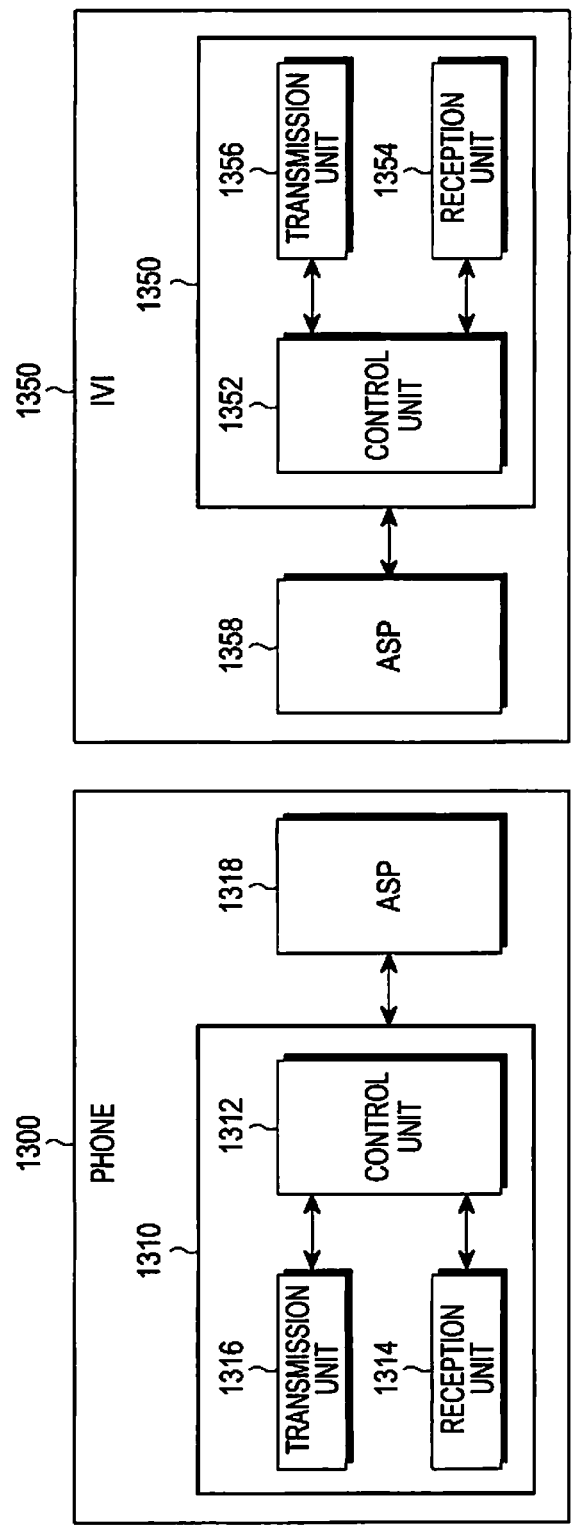
FIG. 13 is a device block diagram according to an embodiment of the present invention.

FIG. 13 is a device block diagram according to an embodiment of the present invention. A vehicle environment includes a phone 1300 and an IVI 1350. The phone 1300 includes a transmission unit 1316, a reception unit 1314, a control unit 1312, and an ASP 1318.

First, the control unit 1312 controls an overall operation of the phone. The control unit 1312 controls the phone to perform the overall operation for enabling switching in an automatic connection mode according to an embodiment of the present invention. Since a detailed operation is the same as that described in FIG. 3 to FIG. 12, the detailed description thereof is omitted herein.

The transmission unit 1316 transmits various signals, various messages, etc., to an IVI and the like according to the control by the control unit 1312. Here, since the various signals, various messages, etc., transmitted by the transmission unit 1316 are the same as those described in FIG. 3 to FIG. 12, the detailed description thereof is omitted herein.

The reception unit 1314 receives various signals, various messages, etc., from the IVI and the like according to the control by the control unit 1312. Here, since the various signals, various messages, etc., received by the reception unit 1314 are the same as those described in FIG. 3 to FIG. 12, the detailed description thereof is omitted herein.

The ASP 1318 means an ASP layer in the phone, processes data received from an application layer in the phone, and performs an overall operation for enabling switching to the IVI 1350 in an automatic connection mode.

The IVI 1350 includes a transmission unit 1356, a reception unit 1354, a control unit 1352, and an ASP 1358.

The control unit 1352 controls an overall operation of the IVI. The control unit 1352 controls the IVI to perform an overall operation for enabling switching in an automatic connection mode according to an embodiment of the present invention. Since a detailed operation is the same as that described in FIG. 3 to FIG. 12, the detailed description thereof is omitted herein.

The transmission unit 1356 transmits various signals, various messages, etc., to a phone and the like according to the control by the control unit 1352. Here, since the various signals, various messages, etc., transmitted by the transmission unit 1356 are the same as those described in FIG. 3 to FIG. 12, the detailed description thereof is omitted herein.

Further, the reception unit 1354 receives various signals, various messages, etc., from the phone and the like according to the control by the control unit 1352. Here, since the various signals, various messages, etc., received by the reception unit 1354 are the same as those described in FIG. 3 to FIG. 12, the detailed description thereof is omitted herein.

The ASP 1358 means an ASP layer in the IVI, processes data received from an application layer in the IVI, and performs an overall operation for enabling switching to the phone 1300 in an automatic connection mode.

It will be understood that a method and device according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the device and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, a device according to an embodiment of the present invention may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. An automatic switching method in a first device, the method comprising:
    performing, by the first device together with a second device, a terminal discovery and a service discovery;
    receiving, from the second device, after performing the terminal discovery and the service discovery, a connection request message including a persistent connection field and a request for an automatic connection mode; and
    providing a particular service to the second device based on information included in the connection request message,
    wherein the persistent connection field includes a service identifier, and is used to initialize a persistent connection between the first and second devices and to maintain a service context for the particular service.

2. The method of claim 1, wherein the automatic connection mode is a mode in which an automatic connection to the first device is enabled when a vehicle starts.

3. The method of claim 1, further comprising mapping a peer-to-peer (P2P) persistent group and the service identifier, based on the persistent connection field.

4. The method of claim 1, further comprising transmitting, to the second device, an automatic connection configuration acceptance message to provide a particular service to the second device, after receiving the connection request message.

5. An automatic switching device in a first device, the automatic switching device comprising:
    a transceiver; and
    a controller coupled to the transceiver and configured to control the first device to:
        perform, together with a second device, a terminal discovery and a service discovery,
        receive, after performing the terminal discovery and the service discovery, a connection request message including a persistent connection field and a request for an automatic connection mode from the second device, and
        provide a particular service to the second device based on information included in the connection request message,
    wherein the persistent connection field includes a service identifier, and is used to initialize a persistent connection between the first and second devices and to maintain a service context for the particular service.

6. The device of claim 5, wherein the automatic connection mode is a mode in which an automatic connection to the first device is enabled when a vehicle starts.

7. The device of claim 5, wherein the controller further enables the first device to perform mapping of a peer-to-peer (P2P) persistent group and the service identifier, based on the persistent connection field.

8. The device of claim 5, wherein the controller further enables the first device to transmit an automatic connection configuration acceptance message to the second device to provide a particular service to the second device, after receiving the connection request message.

9. An automatic switching method in a second device, the method comprising:
    performing, by the second device together with a first device, a terminal discovery and a service discovery;
    transmitting, from the second device, after performing the terminal discovery and the service discovery, a connection request message including a persistent connection field and a request for an automatic connection mode; and
    receiving a particular service from the first device, based on information included in the connection request message,
    wherein the persistent connection field includes a service identifier, and is used to initialize a persistent connection between the first and second devices and to maintain a service context for the particular service.

10. The method of claim 9, wherein the automatic connection mode is a mode in which an automatic connection to the first device is enabled when a vehicle starts.

11. An automatic switching device in a second device, the automatic switching device comprising:
    a transceiver; and
    a controller coupled to the transceiver and configured to control the second device to:
        perform, together with a first device, a terminal discovery and a service discovery,
        transmit, after performing the terminal discovery and the service discovery, a connection request message including a persistent connection field and a request for an automatic connection mode, and
        receive a particular service from the first device based on information included in the connection request message,
    wherein the persistent connection field includes a service identifier, and is used to initialize a persistent connection between the first and second devices and to maintain a service context for the particular service.

12. The device of claim 11, wherein the automatic connection mode is a mode in which an automatic connection to the first device is enabled when a vehicle starts.

* * * * *